United States Patent [19]

Underwood

[11] 4,342,337

[45] Aug. 3, 1982

[54] PROTECTIVE CLOSURE FOR AN ARTICLE

[75] Inventor: Gerald T. Underwood, Moline, Ill.

[73] Assignee: Deere & Company, Moline, Ill.

[21] Appl. No.: 134,932

[22] Filed: Mar. 28, 1980

[51] Int. Cl.³ ............................................. F16L 55/10
[52] U.S. Cl. .................................. 138/96 T; 138/109
[58] Field of Search ...................... 138/96 T, 96 R, 89, 138/109; 285/177, 176

[56] References Cited

U.S. PATENT DOCUMENTS

| | | | |
|---|---|---|---|
| 658,313 | 9/1900 | Bernardi | 138/96 R |
| 2,977,993 | 4/1961 | Scherer | 138/96 T |
| 3,200,984 | 8/1965 | Fuezlien et al. | 138/89 |
| 3,744,528 | 7/1973 | Vestal | 138/96 R |
| 3,948,290 | 4/1976 | Arsland | 138/96 R |

Primary Examiner—Willis Little

[57] ABSTRACT

This invention relates to a protective closure for threaded or non-threaded tubular articles or projections. This protective closure comprises a hollow cylindrical member having an open and a closed end and with at least one internal and one external circularly-shaped plateau. Joined to the open end of the cylindrical member is a flexible sleeve which can be folded back over the article which is to be protected. This folding ability of the sleeve serves as a locking device to retain the protective closure on certain tubular-shaped articles or projections. A number of helical threads can also be formed on each of the plateaus to provide a further locking device when the protective closure is used to protect a threaded article.

12 Claims, 8 Drawing Figures

PROTECTIVE CLOSURE FOR AN ARTICLE

BACKGROUND OF THE INVENTION

1. Field of the Invention

This invention relates to a protective closure for an article. In particular, it relates to a reusable protective closure which can fit various size threaded or non-threaded tubular articles or projections.

2. Description of the Prior Art

Various types of plastic and metal protective devices are currently available which are designed to prevent foreign contamination in fluid lines. These protective devices are installed at the place of manufacture and are intended to remain on the article during shipment and storage. Most of these protective devices rely on friction or threads for holding them in the end of apertured articles. However, experience has shown that simple locking in place is not assured because of vibration and rubbing contact with adjacent parts during transfer. Furthermore, for certain types of plastic protective devices, the frictional action of insertion and removal tends to leave slivers or shaved material in the threads of the article. This, in effect, defeats the purpose of the protective device.

Two other problems associated with currently available protective devices are that: one, each design is suited to fit only one size aperture; and two, many designs are hard to either put on or take off of the article. The combination of these two factors has meant that many articles are not protected at all because the packing personnel cannot locate the right plug when they need it or simply cannot get the protective device onto the article.

The unacceptability of commercially available protective closures has led applicant to invent a new type of protective closure which is both reusable and versatile enough to fit various sizes of apertured or tubular articles or projections.

The general object of this invention is to provide a protective closure for a threaded or non-threaded article. A more specific object of this invention is to provide a protective closure for preventing foreign contamination from entering threaded or non-threaded openings in tubular articles or projections.

Another object of this invention is to provide a one-piece, inexpensive, reusable protective closure for an apertured article.

Still another object of this invention is to provide a protective closure which is easy to install and remove from the end of a tubular article or projection.

Other objects and advantages of this invention will become apparent to one skilled in the art based upon the ensuing description.

SUMMARY OF THE INVENTION

Briefly, the present invention relates to a protective closure for articles. This protective closure is made from a flexible material and has an internal and external step-like cylindrical form with one closed end and one open end. Attached to the open end is a flexible thin-walled sleeve. This flexible thin-walled sleeve is designed to be folded back over the article to more securely lock the protective closure in place whenever the shape of the article to be protected permits.

The principal advantage of this new protective closure is that it can fit various sizes of threaded or non-threaded tubular articles or projections.

DETAILED DESCRIPTION OF THE INVENTION

Figure 1:
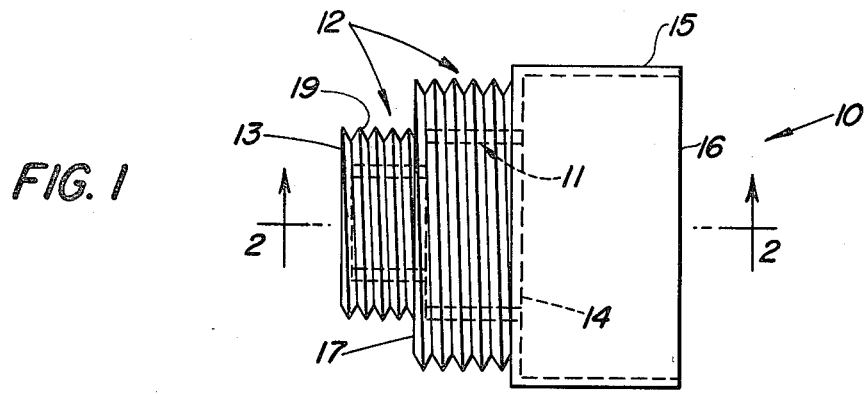
FIG. 1 is a side view of one embodiment of the protective closure.

Referring now to FIG. 1, a one-piece protective closure 10 is shown which can be made from any suitable flexible material. Included in this group of flexible materials are natural and synthetic rubbers, plastic-elastomers, malleable thermoplastics and thermosetting polymers of high molecular weight. Preferably, such flexible material should be oil resistant since the protective closures are most likely to be used to protect fluid and lubricant lines, including lines designed to transfer hydraulic oils.

Figure 6:
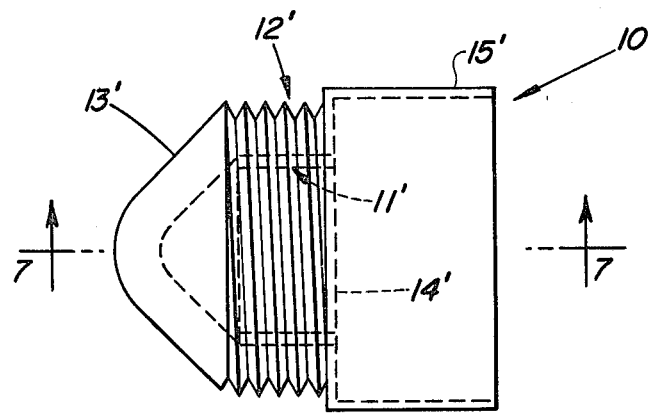
FIG. 6 is a side view of a second embodiment of the protective closure.

The protective closure 10 is formed in the shape of a hollow cylindrical member having at least one internal and one external plateau, 11 and 12 respectively. These step-like circular plateaus 11 and 12 extend away from a closed end 13. The closed end 13 or 13' can be either flat or cone-shaped as shown in FIGS. 1 and 6 respectively. The flat end is preferred when the protective closure 10 is used to protect a hollow tubular article with a threaded interior or exterior end. The cone-shaped end 13' is preferred when the protective closure 10 is used in a flared object, such as a fuel conduit. Aligned opposite the closed end 13 is an open end 14 surrounded by a flexible thin-walled sleeve 15. This flexible sleeve 15, which is spaced radially outward from the plateaus 12, is completely open on one side 16 and has a diameter which is larger than any portion of the largest exterior plateau 12. This larger diameter allows the flexible sleeve 15 to be folded back over the article to be protected so as to more securely lock the protective closure 10 in place.

Figure 2:
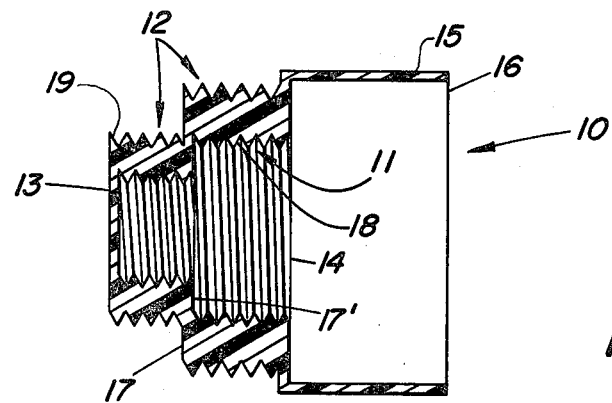
FIG. 2 is a cross-sectional view of FIG. 1 along line 2—2.
Figure 3:
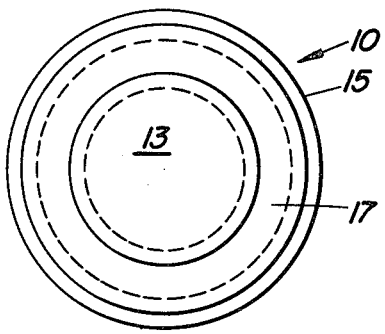
FIG. 3 is a front end view of FIG. 1.

The protective closure 10 is constructed to accommodate various diameters of male or female threaded or non-threaded tubular articles or projections and therefore preferably contains two or more internal and external plateaus, 11 and 12 respectively. As seen in FIG. 2, each of the internal plateaus 11 increases in diameter as the plateau 11 moves away from the closed end 13. In addition, each of the internal and external plateaus 11 and 12 are set off from an adjacent plateau by a flat perpendicular surface 17 and 17'. These flat perpendicular surfaces 17 and 17° serve as a stop so that the protective closure 10 can be locked onto an article. While the protective closure 10 can be used on both threaded and non-threaded articles, it works best on threaded male or female tubular articles or projections. For threaded articles, the combination of the flat perpendicular surface 17 or 17' and the internal or external threads 18 or 19 respectively, provide a unique interlocking means which secures the protective closure 10 to the article. The internal and external threads 18 and 19 can be any type of helical convolutions, including standard right- or left-handed threads, knuckle threads, notched threads, etc. Preferably, each internal and external plateau 11 and 12 will contain at least three full revolutions of helical threads. More preferably, each plateau will contain 3–5 full 360° revolutions of helical threads.

Figure 5:
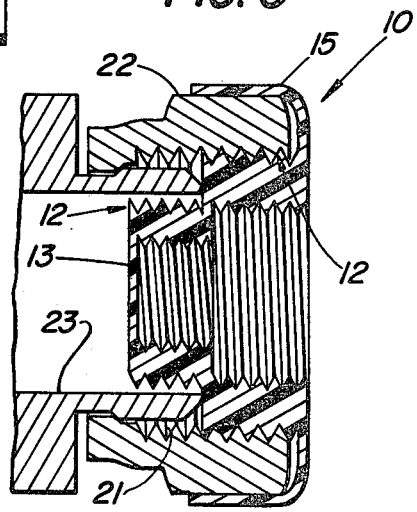
FIG. 5 is a cross-sectional view of FIG. 4 along line 5—5.
Figure 4:
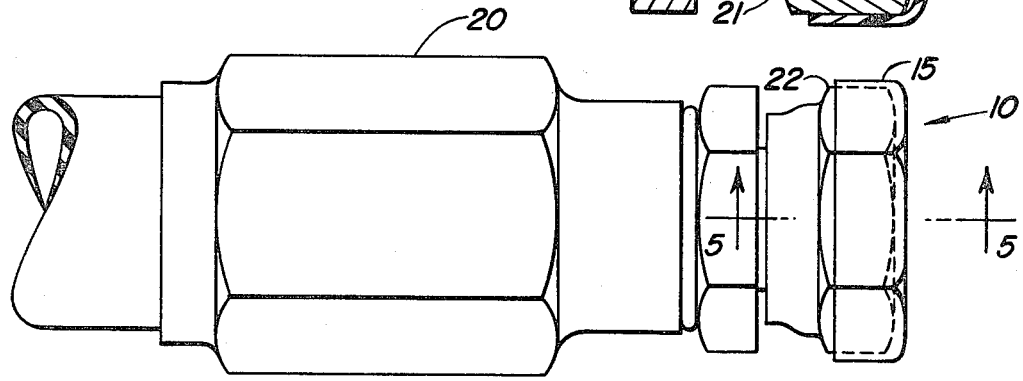
FIG. 4 is a side view of a threaded hose fitting with a protective closure fastened about the right-hand end.

Like the internal plateaus 11, the diameter of each external plateau 12 increases the farther it is situated from the closed end 13. This increase in diameter gives the protective closure 10 the ability to fit over different sizes of tubular articles. For example, FIG. 4 shows a female hose fitting 20 with an attached protective closure 10 having its flexible sleeve 15 folded back onto an outer surface 22 of the hose fitting 20. As better seen in FIG. 5, the larger of the two exterior plateaus 12 matches the diameter of the internal threads 21 on the female hose fitting 20. Furthermore, the smaller diameter of the two exterior plateaus 12 easily fits into an open bore 23 of the female hose fitting 20. This allows the exterior threads 19 on the larger of the two exterior plateaus 12 to thread into the internal threads 21 of the female hose fitting 20. In this case, the smaller of the two exterior plateaus 12 and both of the internal plateaus 11 are not being used. However, when the protective closure 10 is removed from the female hose fitting 20, it is versatile enough to be placed on another article which may have a different diameter male or female thread. This versatility is a feature which distinguishes this particular invention from currently available plugs and caps.

The flexible thin-walled sleeve 15 is employed when the protective closure 10 is threaded or otherwise inserted into a tubular apertured article. By folding back the flexible sleeve 15, a tighter more secure lock is formed and the protective closure 10 is more likely to stay in place. This is true even when the article to be protected is exposed to vibration or rubbing contact with other articles. The flexible sleeve 15 is not folded back when the protective closure 10 is placed on a male tubular-shaped article. Instead, the flexible sleeve 15 serves to provide a grasping means so that the operator can thread or otherwise insert the protective closure 10 onto the article. This allows the operator to obtain a more secure fitting of the protective closure 10 into the article.

Figure 7:
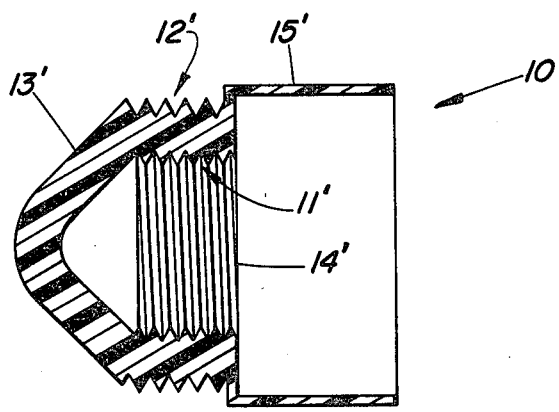
FIG. 7 is a cross-sectional view of FIG. 6 along line 7—7.
Figure 8:
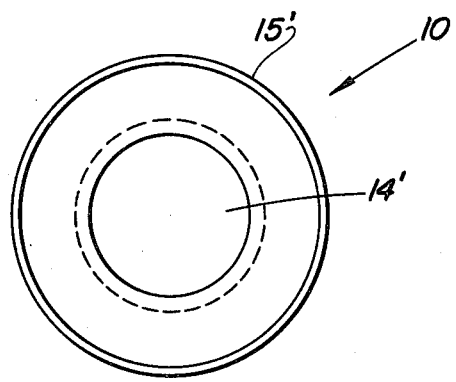
FIG. 8 is a right end view of FIG. 6.

FIGS. 6, 7, and 8 show another embodiment of the protective closure 10 having an open end 14' and a flexible thin-walled sleeve 15'. In this embodiment, the closed end 13' is cone-shaped to better fit into and seal a flange surface of a lubrication line. In addition, only one internal and external plateau, 11' and 12' respectively, are present. The use of only one internal and one external plateau, instead of multiple plateaus, will insure a cost reduction in manufacturing the protective closure 10 and may even be more desirable if a person has a large quantity of articles which have the same internal or external diameter.

While the invention has been described in conjunction with only two specific embodiments, it is to be understood that many alternatives, modifications, and variations will be apparent to those skilled in the art in light of the aforementioned description. Accordingly, it is intended to embrace all such alternatives, modifications, and variations which fall within the spirit and scope of the appended claims.

I claim:
1. A protective closure for an article comprising:
   (a) a hollow member having an open end, a closed end and a cylindrical portion located therebetween, said cylindrical portion having at least two pairs of overlapping, threaded internal and external surfaces; and
   (b) a sleeve extending radially outward from said open end of said hollow member, said sleeve having a flexible thin wall which can be folded back over said article.
2. The protective closure of claim 1 wherein said closed end is cone-shaped.
3. The protective closure of claim 1 wherein said closed end is flat.
4. The protective closure of claim 1 wherein said threads are either right- or left-handed threads.
5. The protective closure of claim 1 wherein each said internal and external surfaces each have at least three full revolutions of helical threads.
6. The protective closure of claim 1 wherein said cylindrical portion is stepped having at least two pairs of overlapping threaded internal and external surfaces.
7. The protective closure of claim 6 wherein said threads on said internal and external surfaces are of different sizes.
8. A protective closure for various size threaded hose fittings comprising:
   (a) a hollow cup-shaped member having an open end and a closed end, said cup-shaped member comprising multiple circular step-like internal and external plateaus of increasing diameters progressing toward said open end;
   (b) a tubular sleeve extending radially outward from said open end of said cup-shaped member, said tubular sleeve having a thin flexible wall, at least a portion of which can be folded back over said hose fitting; and
   (c) thread means formed on both said internal and external plateaus for engaging said threads of said hose fittings.
9. The protective closure of claim 8 wherein said closed end is cone-shaped.
10. The protective closure of claim 8 wherein said thread means are notched helical threads.
11. The protective closure of claim 8 wherein each plateau comprises at least three full revolutions of threads.
12. A protective closure for an article having either a threaded male or female end comprising:
   (a) a hollow member having an open end, a closed end and a stepped cylindrical portions located therebetween, said stepped portions having both threaded internal and external surfaces for alternative engagement with said threaded end of said article; and
   (b) a flexible sleeve extending radially outward from said open end of said hollow member, said sleeve having an outer diameter which is larger than the outer diameter of the largest stepped portion for facilitating the folding of said sleeve back over said article.

* * * * *

UNITED STATES PATENT AND TRADEMARK OFFICE
CERTIFICATE OF CORRECTION

PATENT NO. : 4,342,337

DATED : 3 August 1982

INVENTOR(S) : Gerald T. Underwood

It is certified that error appears in the above-identified patent and that said Letters Patent is hereby corrected as shown below:

Column 4, line 55, delete "a".

Signed and Sealed this

Twenty-eighth Day of June 1983

[SEAL]

Attest:

GERALD J. MOSSINGHOFF

Attesting Officer

Commissioner of Patents and Trademarks